United States Patent
Fuechtner

(10) Patent No.: US 9,707,954 B2
(45) Date of Patent: Jul. 18, 2017

(54) METHOD FOR OPERATING A HYBRID VEHICLE

(75) Inventor: Martin Fuechtner, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/476,462

(22) Filed: May 21, 2012

(65) Prior Publication Data

US 2012/0295758 A1    Nov. 22, 2012

(30) Foreign Application Priority Data

May 19, 2011   (DE) .................. 10 2011 050 496

(51) Int. Cl.
| | |
|---|---|
| *B60W 10/02* | (2006.01) |
| *B60W 20/00* | (2016.01) |
| *B60K 6/48* | (2007.10) |
| *B60K 6/52* | (2007.10) |
| *B60W 10/08* | (2006.01) |
| *B60W 10/11* | (2012.01) |
| *B60W 30/18* | (2012.01) |

(52) U.S. Cl.
CPC ............... *B60W 20/00* (2013.01); *B60K 6/48* (2013.01); *B60K 6/52* (2013.01); *B60W 10/02* (2013.01); *B60W 10/08* (2013.01); *B60W 10/11* (2013.01); *B60W 30/18072* (2013.01); *B60W 30/18136* (2013.01); *B60W 2510/0241* (2013.01); *B60W 2510/081* (2013.01); *B60W 2710/023* (2013.01); *Y02T 10/6221* (2013.01); *Y02T 10/6265* (2013.01); *Y10T 477/26* (2015.01)

(58) Field of Classification Search
CPC ... B60W 2510/204; B60K 6/52; B60K 10/02; Y10T 477/26
USPC ......... 477/5, 3, 175, 8; 903/946; 180/65.265
See application file for complete search history.

(56) References Cited

U.S. PATENT DOCUMENTS

| | | |
|---|---|---|
| 6,244,368 B1 | 6/2001 | Ando et al. |
| 6,932,738 B2 | 8/2005 | Aoki et al. |

(Continued)

FOREIGN PATENT DOCUMENTS

| | | | |
|---|---|---|---|
| CN | 102114766 | * 7/2010 | ................ 477/5 |
| DE | 10327306 | 1/2005 | |

(Continued)

*Primary Examiner* — Stacey Fluhart
(74) *Attorney, Agent, or Firm* — Gerald E. Hespos; Michael J. Porco; Matthew T. Hespos

(57) ABSTRACT

A method is provided for operating a hybrid drive train of a hybrid vehicle. The drive train has an internal combustion engine, a first electric machine, a transmission with an input shaft, a separating element and a first axle. The internal combustion engine can be connected to the first electric machine via the separating element. When the separating element is opened and the internal combustion engine is stationary, a difference in rotational speed occurs at the separating element between the internal combustion engine and the rotating first electric machine. The separating element is opened below and up to a maximum permissible difference in rotational speed at the separating element to drive the hybrid vehicle purely electrically by the first electric machine or to brake the vehicle or to coast. Above the maximum permissible difference in rotational speed the separating element and the first electric machine are separated from one another.

4 Claims, 1 Drawing Sheet

(56) References Cited

U.S. PATENT DOCUMENTS

| | | | |
|---|---|---|---|
| 8,298,117 B2* | 10/2012 | Seel et al. | 477/5 |
| 8,845,482 B2* | 9/2014 | Zhang et al. | 477/5 |
| 2007/0080005 A1* | 4/2007 | Joe | 180/65.2 |
| 2008/0032856 A1* | 2/2008 | Gohring et al. | 477/5 |
| 2008/0064561 A1* | 3/2008 | Popp | B60K 6/48 477/5 |
| 2008/0064564 A1* | 3/2008 | Faust | 477/45 |
| 2008/0305925 A1 | 12/2008 | Soliman et al. | |
| 2010/0216596 A1* | 8/2010 | Kaltenbach | 477/118 |
| 2010/0234171 A1 | 9/2010 | Tanba et al. | |
| 2011/0118078 A1* | 5/2011 | Kraska | B60K 6/48 477/5 |
| 2012/0010041 A1* | 1/2012 | Soliman et al. | 477/5 |
| 2012/0208671 A1* | 8/2012 | Zhu | B60K 6/387 477/5 |
| 2012/0323426 A1* | 12/2012 | Zhang | B60K 6/387 701/22 |

FOREIGN PATENT DOCUMENTS

| | | | | |
|---|---|---|---|---|
| DE | 102009000725 | | 8/2010 | |
| WO | WO 2010145200 A1 * | | 12/2010 | B60K 6/36 |
| WO | WO 2011079740 A1 * | | 7/2011 | B60K 6/387 |

* cited by examiner

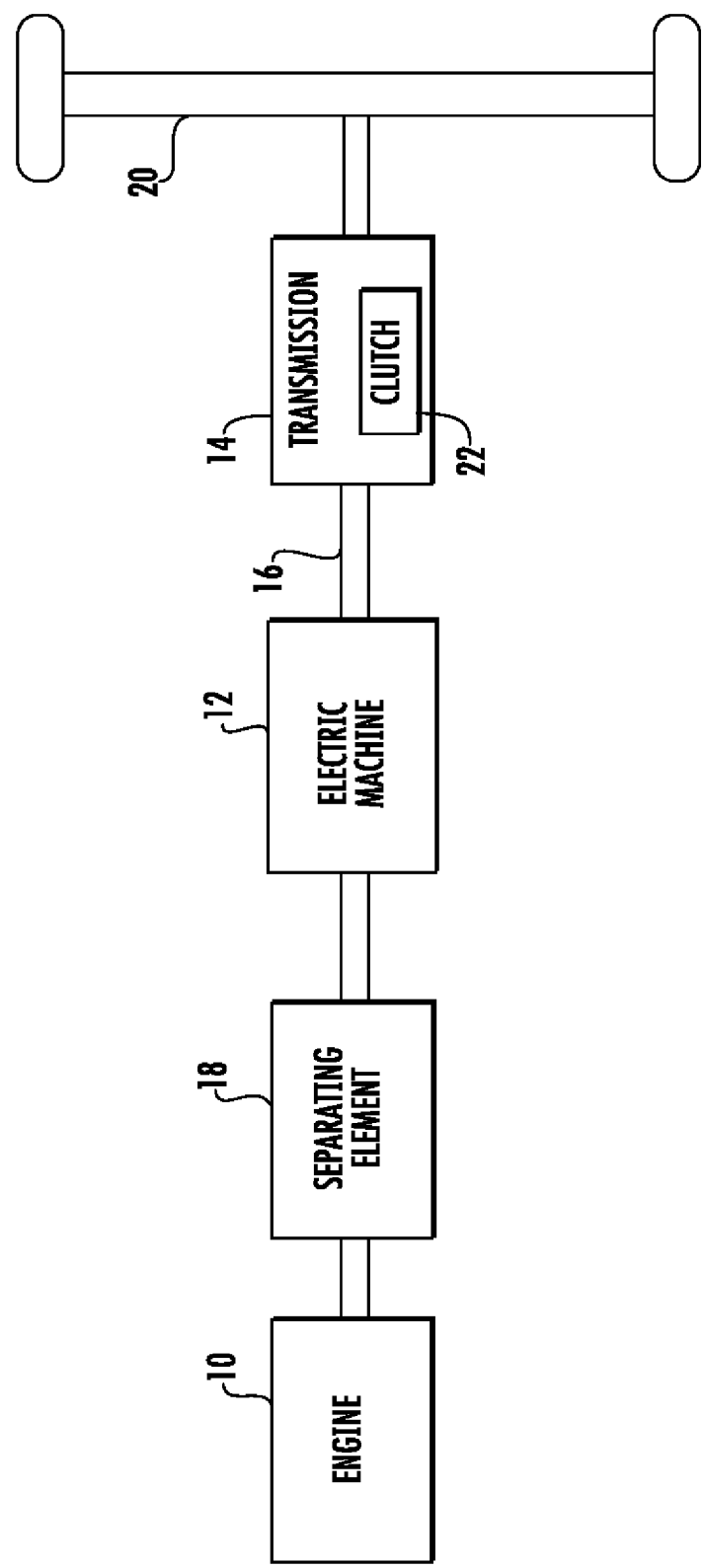

METHOD FOR OPERATING A HYBRID VEHICLE

CROSS REFERENCE TO RELATED APPLICATION

This application claims priority under 35 USC 119 to German Patent Appl. No. 10 2011 050 496.6 filed on May 19, 2011, the entire disclosure of which is incorporated herein by reference

BACKGROUND OF THE INVENTION

1. Field of the Invention

The invention relates to a method for operating a hybrid drive train of a hybrid vehicle.

2. Description of the Related Art

The drive train of a hybrid vehicle has an internal combustion engine, a first electric machine, a transmission with an input shaft, a separating element and a first axle of the hybrid vehicle.

The internal combustion engine is arranged together with the first electric machine on the input shaft of the transmission to drive the first axle of the hybrid vehicle. Furthermore, the internal combustion engine can be connected to the first electric machine via the separating element.

The internal combustion engine can be shut down when this separating element is opened. The first axle of the hybrid vehicle then can be driven purely electrically by the first electric machine, which is operated as a motor, or can be braked by the first electric machine, which is operated as a generator (referred to below as "regeneration") or can roll in an unpowered fashion (referred to below as "coasting").

At high speeds, and particularly in high-power hybrid vehicles, large differences in rotational speed occur between the shut-down, that is to say stationary, internal combustion engine and the rotating first electric machine. However, if a maximum permissible difference in rotational speed is exceeded at the opened separating element, thermodynamic problems or rigidity problems can occur at the separating element.

U.S. Pat. No. 6,932,738 B2 describes a hybrid vehicle with an electric machine that can be decoupled gradually when an axle of the hybrid vehicle is driven purely electrically.

The object of the present invention is to provide a method for operating a hybrid drive train of a hybrid vehicle while avoiding thermal problems or rigidity problems at the opened separating element at high speeds of the hybrid vehicle.

SUMMARY OF THE INVENTION

The method of the invention provides that the separating element is opened below and up to a maximum permissible difference in rotational speed at the separating element to drive the hybrid vehicle purely electrically by the first electric machine or to allow the hybrid vehicle to regenerate or coast. On the other hand, above the maximum permissible difference in rotational speed at the separating element, the separating element and the first electric machine are separated from one another. In this context, a coupling element in the transmission preferably is opened to decouple the separating element and the first electric machine. Due to the separation of the separation element and the first electric machine, the hybrid vehicle also still can coast above the maximum permissible difference in rotational speed at the separating element. Accordingly, at high speeds, particularly in high-performance hybrid vehicles, no thermodynamic problems or rigidity problems occur at the separating element.

The method of the invention is not dependent on whether the hybrid vehicle has the one drivable axle or additionally has one further electrically driven axle. Even in vehicles without a further electrically driven axle, the method of the invention permits the coasting mode at high vehicle speeds, which would cause the difference in rotational speed at the separating element to be unacceptably exceeded.

The hybrid vehicle operated according to the invention preferably is configured so that the drive train has a second axle of the hybrid vehicle and at least one second electric machine for driving the second axle. The hybrid vehicle is driven or braked by the second electric machine above the maximum permissible difference in rotational speed at the separating element. Therefore, the hybrid vehicle also still can travel purely electrically above the maximum permissible difference in rotational speed at the separating element by virtue of the fact that the second axle of the hybrid vehicle is driven purely electrically by the second electric machine operated as a motor, or the hybrid vehicle can regenerate by being braked by the second electric machine operated as a generator. This development therefore also permits the electric driving mode above the maximum difference in rotational speed of the separating element. However, as well as the first axle the further electrically driven axle is necessary here. This configuration also permits the input of heat for electrical cold starting to be reduced, thereby minimizing clutch wear.

A significant feature in the method of the invention is therefore the possibility of separating the separating element and the first electric machine from one another, and particularly using a clutch element of the transmission connected to the hybrid module to perform the function of the separating element within the hybrid module and therefore to avoid the problem of the maximum difference in rotational speed. In this context the drive train is separated by the separating element within the hybrid module for the coasting mode and the electric driving mode up to the point where the difference in rotational speed is reached. When the difference in rotational speed is exceeded, the coasting mode is brought about by the clutch element of the transmission that is connected to the hybrid module and the separating element preferably remains closed within the hybrid module. If a second electric machine is available within the drive train, an electric driving mode also can be formed by this machine in this operating state.

The internal combustion engine preferably is started when the first electric machine of the hybrid module is stationary, as a result of which a high torque is available. Depending on the starting dynamics, the internal combustion engine then can be speeded up and/or dynamically coupled by coupling, in particular by the clutch element, to the transmission that is connected to the clutch element.

BRIEF DESCRIPTION OF THE DRAWING

FIG. 1 is a schematic illustration of a hybrid drive train in accordance with the invention.

DETAILED DESCRIPTION

A drive train of a hybrid vehicle is illustrated in FIG. 1 and includes an internal combustion engine 10, an electric machine 12, a transmission 14 with an input shaft 16, a separating element 18 and a first axle 20 of the hybrid vehicle. The internal combustion engine 10 is arranged together with the electric machine 12 on the input shaft 16 of the transmission 14 to drive the first axle 20 of the hybrid vehicle. The internal combustion engine 10 can be connected to the electric machine 12 via the separating element 18. Alternatively, the internal combustion engine 10 can be shut down when the separating element 18 is opened. The first axle 20 of the hybrid vehicle then can be driven purely electrically by the electric machine 12, which is operated as a motor, or can be braked by the electric machine 12, which is operated as a generator during regeneration or can roll in an unpowered fashion during coasting.

The method of the invention provides that the separating element 18 is opened below and up to a maximum permissible difference in rotational speed at the separating element 18 to drive the hybrid vehicle purely electrically by the electric machine 12 or to allow the hybrid vehicle to regenerate or coast. On the other hand, above the maximum permissible difference in rotational speed at the separating element 18, the separating element 18 and the electric machine 12 are separated from the first axle 20. In this context, a clutch element 22 in the transmission 14 is opened to decouple the separating element 18 and the electric machine 12 from the first axle 20. Due to the separation of the separation element 18 and the electric machine 12, the hybrid vehicle also still can coast above the maximum permissible difference in rotational speed at the separating element 18. Accordingly, at high speeds, particularly in high-performance hybrid vehicles, no thermodynamic problems or rigidity problems occur at the separating element 18.

A significant feature in the method of the invention is using the clutch element 22 of the transmission 14 connected to the hybrid module to perform the function of the separating element 18 within the hybrid module and therefore to avoid the problem of the maximum difference in rotational speed. In this context the drive train is separated by the separating element 18 within the hybrid module for the coasting mode and the electric driving mode up to the point where the difference in rotational speed is reached. When the difference in rotational speed is exceeded, the coasting mode is brought about by the clutch element 22 of the transmission 14 that is connected to the hybrid module and the separating element 18 preferably remains closed within the hybrid module.

What is claimed is:

1. A method for operating a hybrid drive train of a hybrid vehicle, the drive train having an internal combustion engine, an electric machine, a transmission with an input shaft and a clutch element, a separating element and an axle of the hybrid vehicle, the internal combustion engine being arranged together with the electric machine on the input shaft of the transmission to drive the axle of the hybrid vehicle when the separating element is closed, and the internal combustion engine being selectively disconnectable from the electric machine, the transmission and the axle via the separating element, the method comprising:

selectively turning off the internal combustion engine and opening the separating element to permit: purely electric driving of the axle of the hybrid vehicle, regenerative braking or coasting of the hybrid vehicle;

determining a difference in rotational speed occurring at the separating element between the internal combustion engine and the electric machine when the separating element is opened and the internal combustion engine is turned off;

keeping the separating element open below and up to a maximum permissible difference in rotational speed at the separating element between the internal combustion engine and the electric machine while:

operating the electric machine with the clutch element of the transmission closed to drive the axle of the hybrid vehicle purely electrically, or operating the electric machine with the clutch element of the transmission closed to carry out regenerative braking of the hybrid vehicle or allowing the axle of the vehicle to operate in a coasting mode of the hybrid vehicle; and opening the clutch element of the transmission for separating the electric machine from the axle upon reaching the maximum permissible difference in rotational speed and allowing the axle of the vehicle to operate in a coasting mode without exceeding the maximum permissible difference in rotational speed between the electric machine and the internal combustion engine.

2. The method of claim 1, wherein the axle is a first axle and the electric machine is a first electric machine, and wherein the drive train further has a second axle and at least one second electric machine for driving the second axle, the method further comprising using the second electric machine to drive or brake the hybrid vehicle above the maximum permissible difference in rotational speed at the separating element while keeping the clutch element of the transmission open for allowing the first axle to continue operating in the coasting mode.

3. The method of claim 1, further comprising starting the electric machine from a stationary state while the vehicle is coasting, using the started electric machine to start the internal combustion engine, and speeding up the internal combustion engine or dynamically coupling the internal combustion engine to the transmission.

4. The method of claim 1, further comprising closing the separating element between the internal combustion engine and the electric machine while keeping the clutch element of the transmission open and continuing to allow the axle of the vehicle to operate in the coasting mode.

* * * * *